(No Model.) 2 Sheets—Sheet 1.
W. WALKER.
APPARATUS FOR GETTING COAL AND OTHER LIKE MINERALS.
No. 425,718. Patented Apr. 15, 1890.
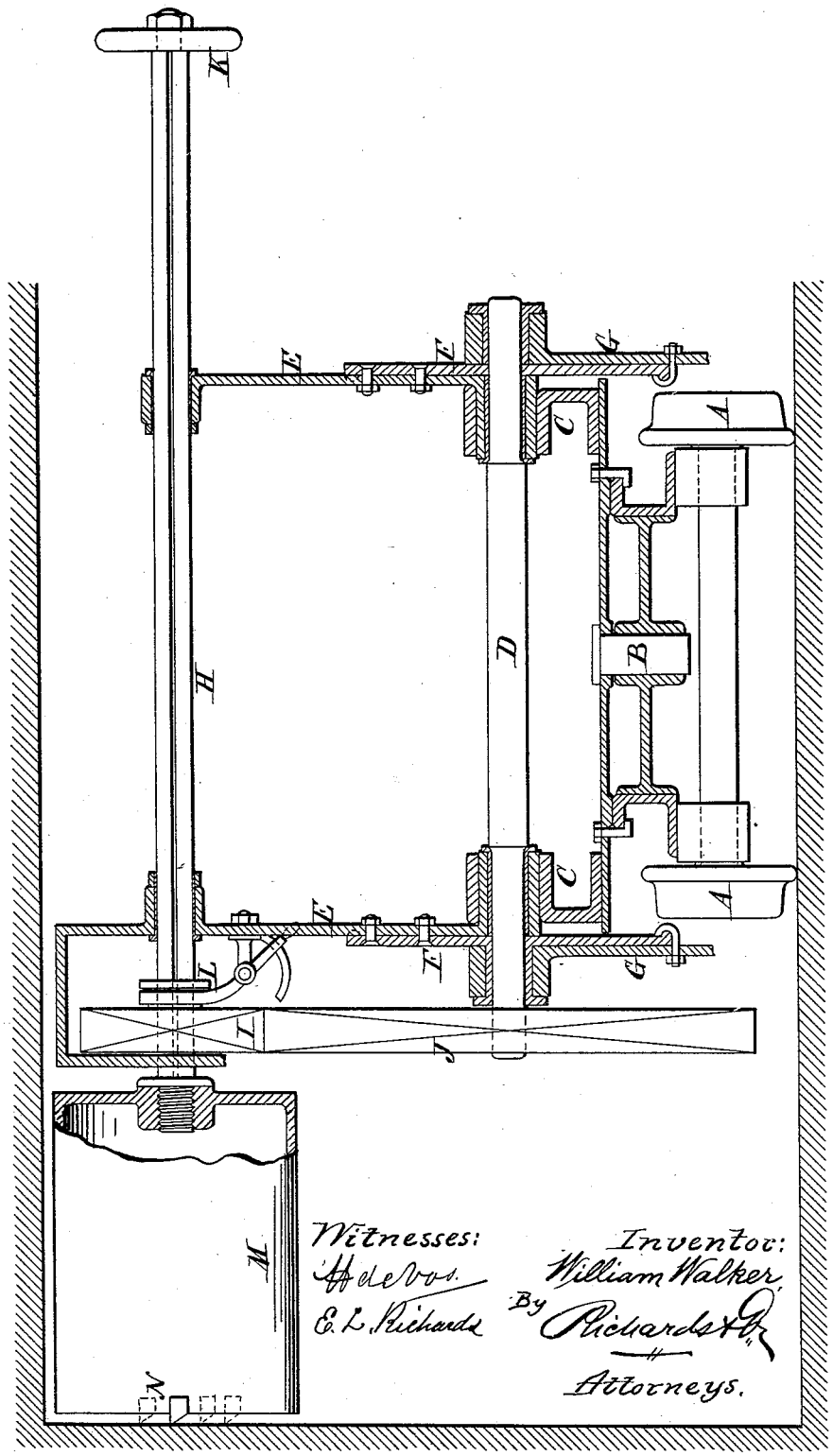

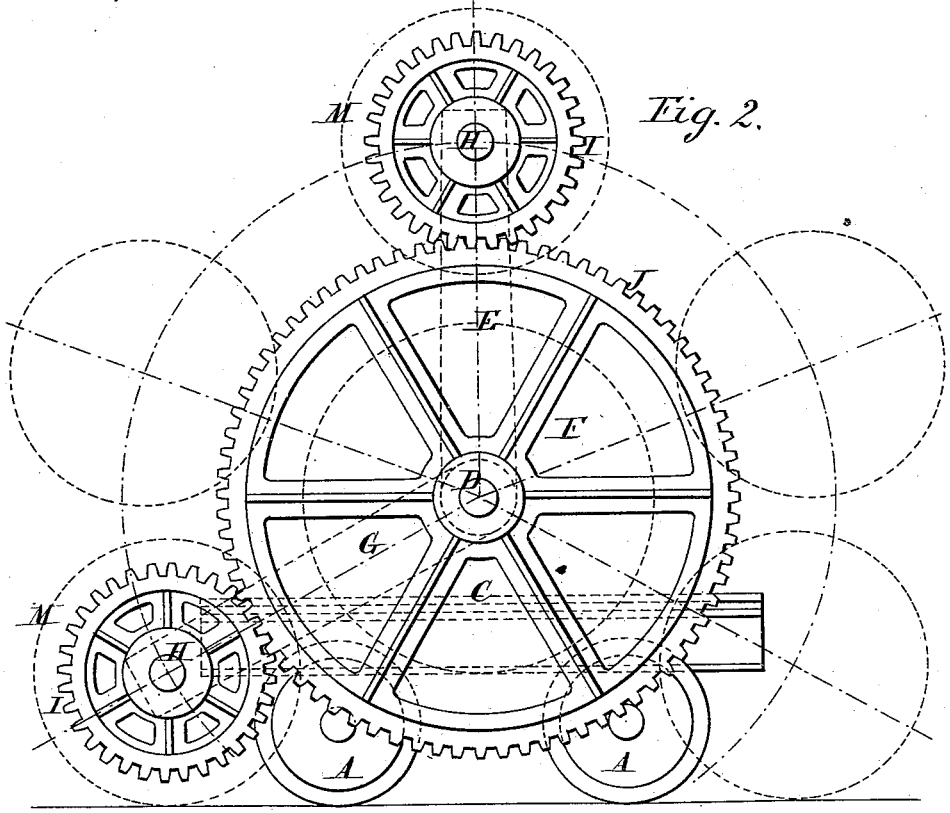
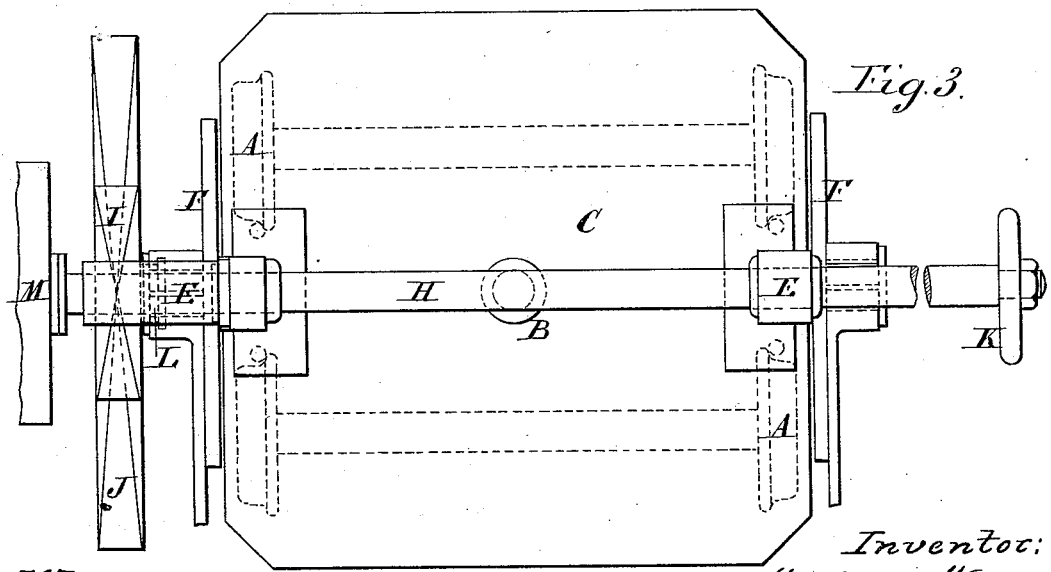

UNITED STATES PATENT OFFICE.

WILLIAM WALKER, OF SALTBURN-BY-THE-SEA, COUNTY OF YORK, ENGLAND.

APPARATUS FOR GETTING COAL AND OTHER LIKE MINERALS.

SPECIFICATION forming part of Letters Patent No. 425,718, dated April 15, 1890.

Application filed June 10, 1889. Serial No. 313,752. (No model.) Patented in England December 10, 1888, No. 18,008; in France May 28, 1889, No. 198,583; in Belgium May 28, 1889, No. 86,427, and in Germany June 2, 1889, No. 50,262.

*To all whom it may concern:*

Be it known that I, WILLIAM WALKER, a citizen of England, residing at Saltburn-by-the-Sea, in the county of York, England, have invented a new and useful Apparatus for Getting Coal and other Like Minerals, (patented in England December 10, 1888, No. 18,008; in France May 28, 1889, No. 198,583; in Belgium May 28, 1889, No. 86,427, and in Germany June 2, 1889, No. 50,262,) of which the following is a specification.

In the specification accompanying an application for patent of even date with the present I describe a method of getting coal and other like minerals by the employment of apparatus which is the subject of my present application.

Referring to the accompanying drawings, Figure 1 is a longitudinal section. Fig. 2 is an end view, and Fig. 3 a plan.

On a truck having wheels A, which may be suited to run on rails or trams or on the ground, is mounted by a perch-pin B the framing C of the machine, which can be turned round the perch-pin as an axis, so as to have its working directed at any angle to the track along which the truck travels. The frame C has bearings for the main shaft D, which may be the crank-shaft of an engine worked by compressed air or water under pressure, or may be a counter-shaft driven by suitable gear from a turbine or from an electric motor, it being understood that the motor, whatever it may be, must be such that it is accommodated on the framing of the machine giving rotation to the shaft D. The bearings of the shaft D form trunnions on which can be turned two arms E—one at each end of the machine—and two disks F, to which these arms are bolted; also, on the bosses of the disks F can be turned another pair of arms G, which can be clamped to the disks F in any position relatively to that of the arms E.
In the arms E, and also in the arms G, are formed bearings for spindles H, which can by moving the respective arms which carry them be swept round the axis of D, always parallel thereto. On these spindles H are pinions I, which gear with a wheel J on the shaft D. Each of the spindles H, by the hand applied to a loose wheel K, can be slid longitudinally through its bearings and through the pinion I, and it has a long slot receiving a feather in a clutch L, which by a hand-lever can be engaged with or disengaged from the pinion I.

On the end of the spindle H is secured a cylindrical saw M, which is preferably made as a cylindrical shell, with several cutters N fixed in its front edge. The spindle H may also have fixed to its end a boring-auger, which can bore a central hole in the mineral while the saw M is cutting a circular chase therein.

In operating with this apparatus I run the truck along the floor of the working, or on rails or trams parallel with the face of the working, and placing it at one end—say the left end—of the working-face, with its main shaft at right angles to the face, I set the one pair E of radial arms and the spindle which they carry so that the saw on that spindle shall cut into the upper left-hand corner, and I set the other pair G of arms and spindle so that their saw shall cut into the lower left-hand corner.

When the saws, which may be one foot in diameter, have by hand-pressure applied to the wheels K been advanced to the required depth—such as one foot—into the mineral, I withdraw them. I then advance the machine about a foot, and again work in the saws; and thus I proceed until a row of circular chases is cut into the mineral along the top and a row along the bottom of the working-face of the seam. I prize or wedge out the cores of the chases, and thus form, as it were, a continuous groove above and below the middle part of the seam, which may be then broken down in mass or cut out in cores by the machine.

When it is necessary, I employ the saws also to cut circular chases in a vertical row at each side of the working-face, so as to separate the ends of the middle body from the side walls of the working.

In order to facilitate the removal of the cores left by the saws, I employ the augers along with the saws for some of the cuts, so as to drill in some of the cores central holes, in which a lever may be inserted to prize out the cores.

I claim—

Apparatus for getting coal and other like mineral, consisting of a truck carrying on a perch-pin a framing with a suitable motor giving revolution to a main shaft, a toothed wheel on this shaft gearing with pinions on two sliding spindles mounted parallel to the shaft on arms fitted to swing round the shaft to different positions, and cylindrical saws or cutters fixed on the said spindles, substantially as described.

In testimony whereof I have signed my name to this specification, in the presence of two subscribing witnesses, this 25th day of May, A. D. 1889.

WM. WALKER.

Witnesses:
J. I. BURTON,
*Secretary of Iron Works Co., Middlesbro.*
H. THOMPSON,
*Clerk in Iron Works Office, Middlesbro.*